United States Patent
Rinaldo

(10) Patent No.: US 6,834,860 B2
(45) Date of Patent: Dec. 28, 2004

(54) LIQUID SEAL

(75) Inventor: John M. Rinaldo, East Greenbush, NY (US)

(73) Assignee: Atlas Copco Comptec Inc., Voorheesville, NY (US)

(*) Notice: Subject to any disclaimer, the term of this patent is extended or adjusted under 35 U.S.C. 154(b) by 0 days.

(21) Appl. No.: 10/269,434

(22) Filed: Oct. 11, 2002

(65) Prior Publication Data

US 2003/0030223 A1 Feb. 13, 2003

Related U.S. Application Data

(63) Continuation-in-part of application No. 09/653,237, filed on Aug. 31, 2000, now Pat. No. 6,467,773.

(51) Int. Cl.[7] .............................................. F16J 15/447
(52) U.S. Cl. ...................... 277/418; 277/419; 277/420
(58) Field of Search ................................ 277/418–420, 277/423–424

(56) References Cited

U.S. PATENT DOCUMENTS

| | | | | |
|---|---|---|---|---|
| 898,257 A | * | 9/1908 | Parsons et al. ............. | 277/419 |
| 913,407 A | * | 2/1909 | Ljunstrom .................. | 277/347 |
| 1,708,044 A | * | 4/1929 | Baumann .................... | 277/418 |
| 1,831,242 A | * | 11/1931 | Hanzlik ....................... | 277/418 |
| 2,123,818 A | * | 7/1938 | Wegmann .................... | 277/419 |
| 2,245,281 A | * | 6/1941 | Klopak ........................ | 277/419 |
| 2,439,917 A | * | 4/1948 | Anderson .................... | 277/429 |
| 2,598,381 A | * | 5/1952 | Hoffman ...................... | 277/429 |
| 4,046,388 A | * | 9/1977 | Meyer ......................... | 277/418 |
| 4,101,180 A | * | 7/1978 | Anderson et al. ........... | 384/418 |
| 4,351,532 A | | 9/1982 | Laverty | |
| 4,363,490 A | * | 12/1982 | Kuehn ......................... | 277/420 |
| 4,630,458 A | * | 12/1986 | Kakabaker ................... | 72/237 |
| 4,743,034 A | * | 5/1988 | Kakabaker et al. ......... | 277/420 |
| 4,848,937 A | * | 7/1989 | Hartman et al. ............. | 384/480 |
| 4,890,941 A | * | 1/1990 | Calafell et al. .............. | 277/347 |
| 4,989,883 A | | 2/1991 | Orlowski | |
| 5,029,876 A | * | 7/1991 | Orlando et al. ............. | 277/419 |
| 5,038,631 A | * | 8/1991 | Renk et al. .................. | 74/467 |
| 5,174,583 A | | 12/1992 | Orlowski et al. | |
| 5,228,700 A | * | 7/1993 | Biesold et al. .............. | 277/421 |
| 5,290,047 A | * | 3/1994 | Duffee et al. ............... | 277/419 |
| 5,639,095 A | * | 6/1997 | Rhode ......................... | 277/303 |
| 5,890,873 A | * | 4/1999 | Willey ........................ | 415/173.5 |
| 6,139,019 A | * | 10/2000 | Dinc et al. .................. | 277/355 |
| 6,467,773 B1 | * | 10/2002 | Rinaldo ....................... | 277/409 |

* cited by examiner

Primary Examiner—Alison K. Pickard
(74) Attorney, Agent, or Firm—Wall Marjama & Bilinski LLP

(57) ABSTRACT

A non-contacting seal which includes a stationary tooth that radially overlaps a tooth on a rotatable shaft, with the sealing action resulting from controlled clearance both radially between stationary tooth and the shaft, and axially between the stationary tooth and the shaft. The seal may also be in the form of a stationary tooth that is approximately in the same radial plane as a tooth on a rotatable shaft, with the sealing action resulting from both a controlled clearance gap between the two teeth and from the momentum of liquid traveling outward from the rotating tooth making it difficult for the liquid to turn to go axially through the gap between the rotating tooth and the stationary tooth. The seal may also comprise the combination of the two seals described above or a pair of the same seals, i.e., two radially overlapping or two in the same radial plane.

3 Claims, 3 Drawing Sheets

LIQUID SEAL

CROSS REFERENCE TO RELATED APPLICATION

This is a continuation-in-part application of U.S. Ser. No. 09/653,237, filed Aug. 31, 2000, now U.S. Pat. No. 6,467,773 issued Oct. 22, 2002, the entirety of which is incorporated herein by reference.

BACKGROUND OF THE INVENTION

This invention relates in general to a seal and more specifically to a non-contacting device that prevents a liquid such as oil from escaping from an enclosed cavity such as a gearbox along a rotatable shaft.

Gearboxes typically use oil as a lubricant both between the gear teeth and in the bearings that support the shaft. The level of the oil is below the opening for the shaft, but typically when operating the gearbox is filled with a mist of oil. Oil is also splashed throughout the gearbox either by the action of the gear dipping into the oil or by a pressurized lubrication system that supplies oil to the bearings and sprays oil onto the gears. Leakage of this oil can cause environmental and economic problems. For example, in many high-speed centrifugal compressors the impeller is mounted directly on the output shaft of the gearbox. When the compressor is unloaded any oil that gets out of the gearbox may get sucked into the compressor and contaminate what should be an oil free area. When the compressor is subsequently loaded, the oil can travel with the compressed gas and contaminate the process. This is unacceptable in many plants, such as in pharmaceutical manufacturing.

One type of seal used extensively to prevent oil leakage from a gearbox is the mechanical seal. This type of seal, however, is speed limited and therefore cannot be used for very high speed shafts such as those used in centrifugal compressors. This is because typical mechanical seals generate excessive heat due to the mechanical shearing of the oil at high peripheral speeds. Mechanical seals may also wear over time, and need periodic replacement.

Another seal type that is well known in the art is the labyrinth seal. Since this type of seal is non-contacting, it is used extensively on high-speed equipment. Unfortunately, they are not very good oil seals unless either a buffer gas is used to assure that there is a continuous flow of gas towards the gearbox to prevent the oil from migrating out or enough axial space is provided for at least two sets of teeth with an oil drain between them. Use of a buffer gas adds to both initial, ongoing and maintenance costs, while lowering reliability. Adding additional axial space may cause rotodynamic problems, as well as added cost to the system.

As can be seen from the above description, oil seals in the past have worked with varying degrees of efficiency, but have either required external support, lacked reliability or required a large axial space.

SUMMARY OF THE INVENTION

It is therefore an object of the present invention to provide a seal means which overcomes the problems of the prior art described above.

It is another object of the present invention to provide a seal which prevents oil leakage from an enclosure along a rotatable shaft.

It is a further object of the invention to provide a simple seal design that does not rely on external support for its proper operation.

Another object of the present invention is to provide a seal design which minimizes the axial length needed for the oil seal.

These and other objects of the present invention are obtained by the configuration of a rotatable shaft operating in conjunction with stationary seal teeth connected to a housing or suitable support.

The present invention is directed to an annular non-contacting seal comprising a stationary tooth that radially overlaps a tooth on a rotatable shaft, with the sealing action resulting from controlled clearance both radially between the stationary tooth and the shaft and axially between the stationary tooth and the shaft. In a second embodiment the non-contacting seal may comprise a stationary tooth that is approximately in the same radial plane as a tooth on a rotatable shaft, with the sealing action resulting from both the controlled clearance between the two teeth and from the momentum of the liquid traveling outward from the rotating tooth making it difficult for the liquid to turn to go axially through the gap between the rotating tooth and the stationary tooth. In a preferred embodiment, the seal may comprise the combination of the seals in the two embodiments described above. The stationary teeth which comprise the seal may be made of any suitable material. Typical materials include metals, plastics and ceramics. In one embodiment the seals were made of an aluminum alloy.

The seal functions to prevent oil leakage from an enclosure adjacent or surrounding a rotatable shaft such as that used in a high speed centrifugal compressor in which an impeller is mounted on the output shaft of a gearbox.

BRIEF DESCRIPTION OF THE DRAWINGS

For a fuller understanding of the nature and objects of the invention, reference should be made to the following detailed description of a preferred mode of practicing the invention, read in connection with the accompanying drawings, in which.

DETAILED DESCRIPTION OF THE INVENTION

For a better understanding of these and other objects of the present invention, reference shall be made to the following detailed description of the invention, which is to be read in association with the accompanying drawings.

Figure 1:
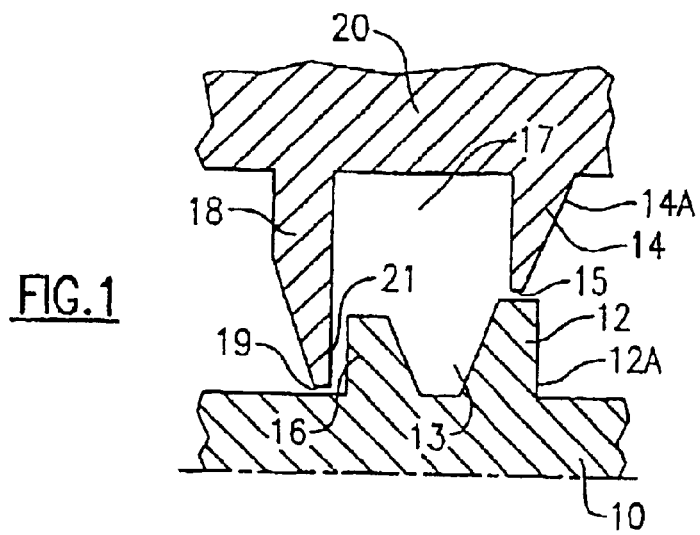
FIG. 1 is a schematic plane view of one embodiment of the seal showing its proximity to a bearing.

FIG. 1 is a schematic representation of one embodiment of the present invention. In FIG. 1 a shaft 10 typically has two oil slingers 12 and 16 respectively, and each oil slinger has a stationary tooth associated with it. The bearing side stationary tooth 14 (towards the inside of the enclosure or housing 20) is in close proximity to the outside diameter of oil slinger 12. This tooth and slinger combination limits the amount of oil that can reach the groove or cavity 13 between the two slingers. Groove 13 should be sufficiently large that any liquid that leaks into it flows down the groove without filling it, and does not bridge the groove due to capillary action. Furthermore, when shaft 10 is rotating, oil on the shaft will be thrown from the rotating slinger tooth 12 and its momentum will carry it past the gap 15 between rotating slinger tooth 12 and the stationary tooth 14. The high velocity flow of liquid past the gap may act as a venturi, and actively draw air into the gearbox, thus preventing leakage of oil out. Any oil that does get past this first slinger is channeled around the shaft either in the groove 13 between the two oil slingers or in the gap 17 between the two teeth 14 and 18. The oil is then drained back into either the gearbox or the oil reservoir (not shown). The primary tooth 18 is designed to overlap the primary oil slinger 16 in the radial direction, i.e. the tip diameter of the tooth is just slightly larger than the root diameter of the oil slinger. Both the radial gap 19 from the shaft to the primary tooth and the axial gap 21 from the primary tooth to the primary slinger must be controlled, but this is not difficult to do with normal manufacturing tolerances. For a shaft having a diameter of about 1½ inches, gaps 15 and 19 are in the range of about 0.004–0.010 inches, with axial gap 21 being in the range of about 0.005–0.045 inches.

Oil that gets into the axial gap 21 between the tooth and oil slinger will not go through the small gap 19 between the tooth and the shaft when the shaft is stationary, and is thrown out of the axial gap by centrifugal force when the shaft is rotating. Even droplets of oil on the face of the tooth that are so small that they do not bridge the gap will be moved outward by centrifugal force due to the rotation of the air in the gap between the tooth and slinger. Thus oil or other liquid will be retained in the gearbox or similar enclosure whether or not the shaft is rotating.

Figure 2:
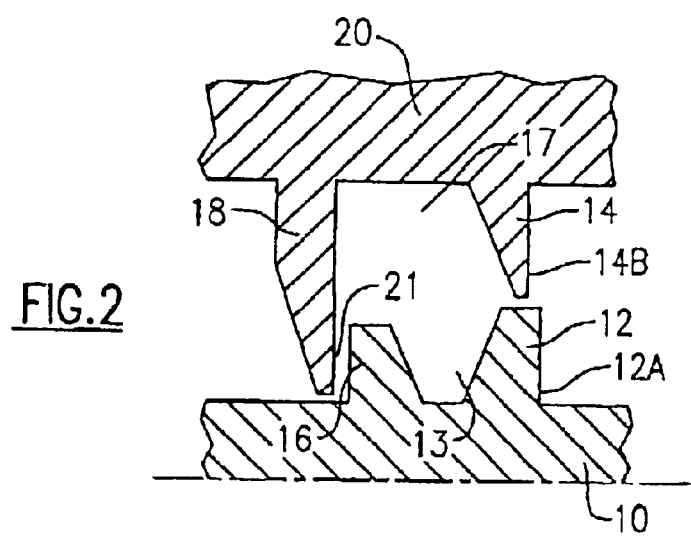
FIG. 2 is a plane view of a second embodiment of the seal also showing its proximity to a bearing.

It is possible to use either tooth and slinger pair combination separately, but the preferred embodiment of this invention uses the two pair together. FIG. 1 illustrates a sloped outer side 14A on the secondary seal tooth so liquid thrown from the rotating slinger tooth will be deflected. FIG. 2 illustrates a straight outer side 14B on the secondary seal tooth so a split bearing (not shown) that is in very close proximity to the rotating slinger tooth may be removed radially without disturbing the stationary seal tooth. Note that the face 12A of the slinger tooth 12 may also be used as a thrust surface that the bearing acts upon (in either the configuration illustrated in FIG. 1 or FIG. 2).

Figure 3:
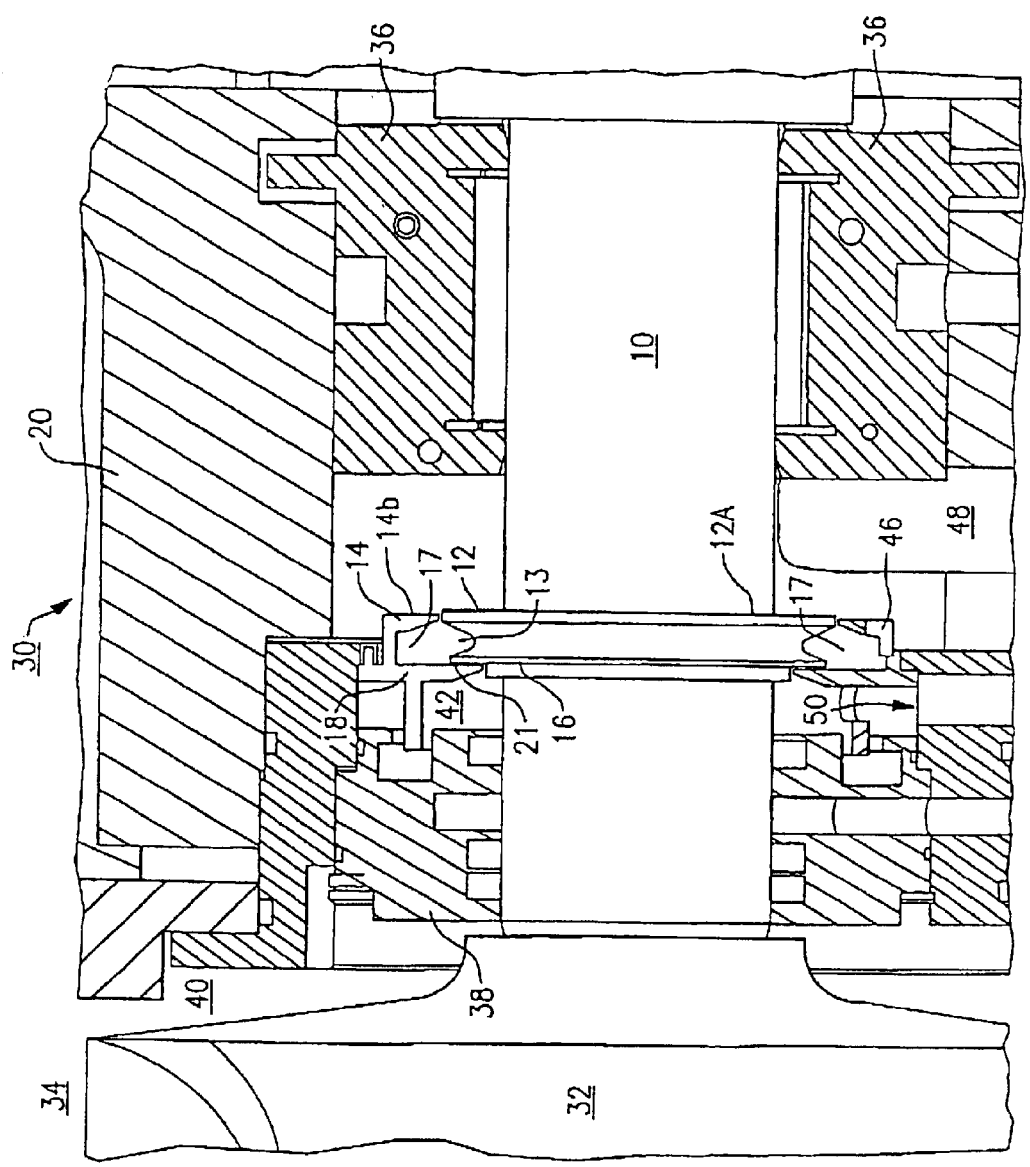
FIG. 3 is a sectional plane view of part of a centrifugal compressor (or turbine) stage utilizing the seal system of the present invention.
Figure 4:
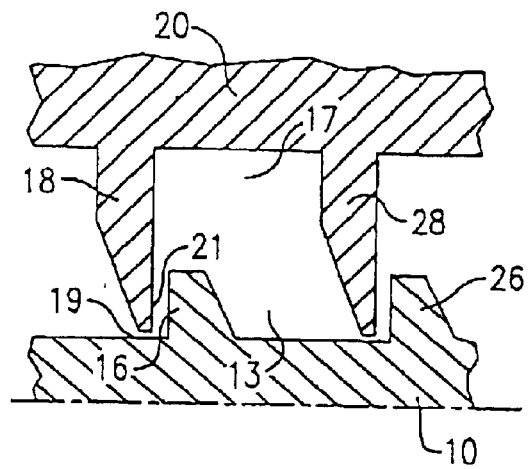
FIG. 4 is a schematic plane view of a third embodiment of the seal, designed with identical teeth.

FIG. 4 is a schematic plane view of a third embodiment of the present invention. In FIG. 4 the two stationary teeth 18 and 28 are substantially similar, and the two oil slingers (rotating teeth) 16 and 26 are substantially similar. In this configuration, the stationary teeth must normally be split to allow assembly. Groove or cavity 13 is again provided to direct any oil that does get past tooth 28 and slinger 26 down to the bottom of gap 17 (FIG. 3) where it will be drained.

Figure 5:
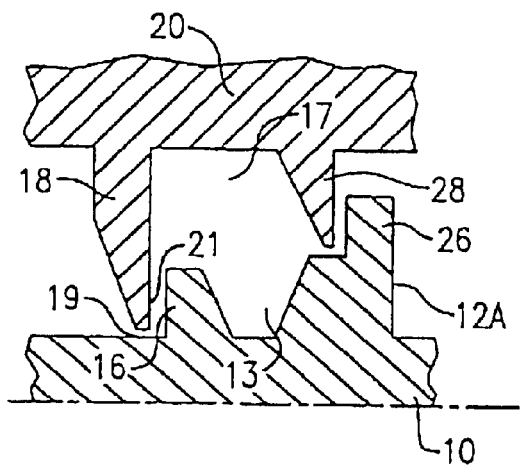
FIG. 5 is a schematic plane view of a fourth embodiment of the seal that allows assembly without splitting the stationary part of the seal.

FIG. 5 is a schematic plane view of a fourth embodiment of the present invention. In FIG. 5 the two stationary teeth 18 and 28 are similar, however tooth 28 is displaced radially outward so that the inner diameter of tooth 28 is greater than the outer diameter of tooth 16, thus allowing axial assembly of the teeth over the slingers. A groove or cavity 13 is provided to direct any oil that does get past tooth 28 and slinger 26 down to the bottom of gap 17 where it will be drained.

Figure 6:
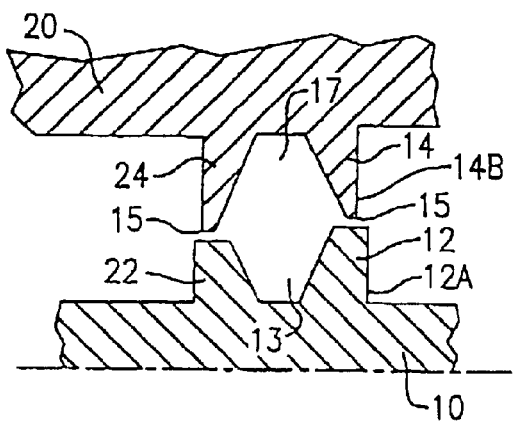
FIG. 6 is a schematic plane view of a fifth embodiment of the seal.

FIG. 6 is a schematic plane view of a fifth embodiment of the present invention. In FIG. 6 the two stationary teeth 14 and 24 are similar, though they may be mirror images. Assembly of this configuration is simple because there is no radial overlap. Slinger 12 and stationary tooth 14 may be configured the same way as was described for FIG. 1 or 2. Tooth 24 acts as a normal labyrinth tooth, except it acts in conjunction with the outer diameter of slinger tooth 22 rather than with a shaft surface. A groove or cavity 13 is provided to direct any oil that does get past tooth 14 and slinger 12 down to the bottom of gap 17 where it will be drained.

FIG. 3 is a plane view of part of a centrifugal compressor 30 (or turbine) stage utilizing the seal system of the present invention. Reference character 32 illustrates the compressor (or turbine) impeller which discharges air or other gas at area 34. The shaft 10 transmits power to or from the impeller. The shaft 10 is rotationally symmetric. The shaft is supported on radial bearing 36, and may also be supported by another bearing (not shown). The bearing may be designed to also act as a thrust bearing, and could use the bearing side slinger face 12A as a thrust surface.

A seal 38 is designed to restrict the flow of air or other gas between from behind the impeller (area 40) to the cavity 42. Cavity 42 is freely vented to atmosphere, so the pressure in cavity 42 should be atmospheric. However, when the pressure in area 34 and therefore the pressure in area 40 is below atmospheric, the leakage of gas from 42 to 40 may cause cavity 42 to be very slightly below atmospheric.

The flow of oil from the pressurized radial bearing 36 may forcefully impinge on the face 12A of bearing side slinger 12 where it will be turned to either flow radially outward away from the shaft and/or to move tangentially around the shaft and drip off slinger 12. Bearing side seal tooth 14 is in very close radial proximity to slinger 12, so little if any oil will leak through the very small gap between them. Any oil that does get through the gap between bearing side seal tooth 14 and slinger 12 will either be caught in groove 13 and flow to the bottom of the shaft where it will drip off or it will just flow along the walls of cavity 17 to the bottom, where it will flow through drain 46 back into the gearbox, and then down drain 48. Drain 46 may be just a hole or slot in the bearing side seal tooth 14 as shown, or it may be a drain with a liquid trap to prevent the communication of gases between cavity 17 and the gearbox drain 48.

The impeller side tooth 18 overlaps slinger 16 as shown in FIGS. 1, 2, 3, 4 and 5. It is both in close radial proximity to the shaft 10 and in close axial proximity to slinger 16. The slingers 12 and 16 may be integral with or shrunk onto the shaft 10.

Drain 50 may be provided to drain any oil that does get past the seals, and may also serve as the vent for cavity 42.

While the present invention has been particularly shown and described with reference to the preferred mode as illustrated in the drawing, it will be understood by one skilled in the art that various changes in detail may be effected therein without departing from the spirit and scope of the invention as defined by the claims.

I claim:

1. A non-contacting annular seal for a rotatable shaft with said shaft having an axis of rotation in a substantially horizontal plane which consists of in combination:
   (a) first seal means which includes a first stationary tooth that radially overlaps a first tooth on a rotatable shaft, with the sealing action resulting from controlled clearance both radially between the stationary tooth and the shaft and axially between the stationary tooth and the shaft;

(b) second seal means adjacent said first means which includes a second stationary tooth that radially overlaps a second tooth on a rotatable shaft, with the sealing action resulting from controlled clearance both radially between the second stationary tooth and the shaft and axially between the second stationary tooth and the shaft;

(c) first drain means positioned between the said teeth on said rotatable shaft comprising a groove between said teeth, which functions to enhance the sealing action by guiding any liquid around the shaft to the bottom rather than allowing unimpeded flow axially along said shaft;

(d) second drain means positioned between the said stationary teeth comprising an annular cavity which functions to guide liquid away from the radial gap between said rotating and stationary teeth; and (e) third drain means positioned through the bottom of said second stationary tooth means which functions to allow any liquid between two said seal means to flow back to a gearbox or reservoir.

2. The seal of claim 1 in which the second stationary tooth is displaced radially outward so that the inner diameter of said second stationary tooth is greater than the outer diameter of said first tooth on said rotatable shaft.

3. A non-contacting annular seal for a rotatable shaft with said shaft having an axis of rotation in a substantially horizontal plane which consists of in combination:

(a) first seal means which includes a first stationary tooth that is approximately in the same radial plane as a first tooth on a rotatable shaft, with the sealing action resulting from both a controlled clearance gap between said two teeth and from the momentum of the liquid traveling outward from said rotating tooth;

(b) second seal means adjacent said first means which includes a second stationary tooth that is approximately in the same radial plane as a second tooth on a rotatable shaft, with the sealing action resulting from both a controlled clearance gap between said two teeth, and from the momentum of the liquid traveling outward from said rotating tooth;

(c) first drain means positioned between the said teeth on said rotatable shaft comprising a groove between said teeth, which functions to enhance the sealing action by guiding any liquid around the shaft to the bottom rather than allowing unimpeded flow axially along said shaft;

(d) second drain means positioned between the said stationary teeth comprising an annular cavity which functions to guide liquid away from the radial gap between said rotating and stationary teeth; and (e) third drain means positioned through the bottom of said second stationary tooth means which functions to allow any liquid between two said seal means to flow back to a gearbox or reservoir.

* * * * *